United States Patent [19]
Immel

[11] Patent Number: 6,152,323
[45] Date of Patent: Nov. 28, 2000

[54] LIQUID CONTAINER DISPENSING APPARATUS

[76] Inventor: Nancy K. Immel, 4590 245th St. North, Forest Lake, Minn. 55025

[21] Appl. No.: 09/100,719

[22] Filed: Jun. 19, 1998

[51] Int. Cl.[7] .................................................. B65G 59/00
[52] U.S. Cl. .......................................... 221/129; 221/251
[58] Field of Search .................................. 221/129, 193, 221/131, 194, 195, 251, 273, 274, 268

[56] References Cited

U.S. PATENT DOCUMENTS 4,485,937 12/1984 Adams ..................................... 221/129

Primary Examiner—Kenneth W. Noland

[57] ABSTRACT

A liquid container dispensing apparatus having a storage unit, a storage rack including tiered shelves and separated compartments with the shelves terminating short of the back wall of the storage unit and being inclined downwardly from the front to the rear, lever members for each compartment with each lever member being pivotally mounted upon a fulcrum member which is disposed upon the bottom wall, catch members extending downwardly from the back ends of the lever members to prevent advancement of the next-in-line liquid containers as the first-in-line liquid containers are being dispensed with the lever members, and linkage members connected to the lever members to facilitate the dispensing of the liquid containers along the lever members and also to prevent freely falling of the first-in-line liquid containers.

12 Claims, 9 Drawing Sheets

LIQUID CONTAINER DISPENSING APPARATUS

BACKGROUND OF THE INVENTION

This invention relates to a liquid container dispensing apparatus for individually dispensing liquid containers from a storage member and also relates to a liquid container dispensing apparatus which quickly and conveniently dispenses such containers into the hand of a user without substantial agitation of the contents of the can.

Many nightclubs, dance halls, restaurants and taverns are equipped with one or more beer serving stations at which a variety of canned beer products are maintained. Typically, such canned beer products are stocked in refrigerated cabinets or chests behind the bar. When the bartender receives an order for a particular canned beer product, he must open the door to the cabinet or chest, pull out the desired product, and then close the door, all of which is not only a very time consuming process but also causes strain to the bartender's back because the bartender must stoop to retrieve the desired product from the cabinet or chest which usually sits on the floor behind and below the bar. In addition, the bartender generally has to hunt around inside the cabinet in order to find the desired product because the products are not systematically arranged. The amount of revenues generated by such establishments are directly connected to the number of cans of beer sold, a problem not solved with having these types of cabinets.

One known prior art is a CAN DISPENSING APPARATUS, U.S. Pat. No. 4,485,937, invented by Morgan A. Adams and issued on Dec. 4, 1984 and which comprises a serpentine storage rack which substantially decreases the number of cans that can be stored and also comprises a dispensing lever, a stop secured to the discharge end for engaging the first can in line to prevent the serially aligned cans from freely falling out of the apparatus, and a linkage for guiding the turning movement of the dispensing lever between its rest position and a raised position.

SUMMARY OF THE INVENTION

The present invention relates to a liquid container dispensing apparatus which comprises a storage means, a storage rack having a plurality of compartments with each compartment having a plurality of tiered shelves capable of storing a plurality of liquid containers rollably disposed side-by-side, and which also comprises a dispensing means including a fulcrum member, a lever member pivotable upon the fulcrum member, a catch member disposed at an end of the lever member for stopping a second liquid container from advancing while a first liquid container is being dispensed, and a dispensing chute for dispensing the liquid containers which are stored on the storage rack and which are dispensed one by one simply by the user moving the first end of the lever in a downwardly manner.

One objective of the present invention is to provide a liquid container dispensing apparatus which allows the user to store many more liquid containers rollably side-by-side than that capable of the prior art.

Another objective of the present invention is to provide a liquid container dispensing apparatus which allows the user to easily and conveniently dispense liquid containers one by one with very little agitation to each liquid container.

Also, another objective of the present invention is to provide a liquid container dispensing apparatus which substantially reduces strain on the user's back while dispensing liquid containers therefrom.

Yet, another objective of the present invention is to provide a liquid container dispensing apparatus which allows the user to have better inventory control over any of the prior art.

Further objectives and advantages of the present invention will become apparent as the description proceeds and when taken in conjunction with the accompanying drawings wherein:

DETAILED DESCRIPTION OF THE INVENTION

Figure 1:
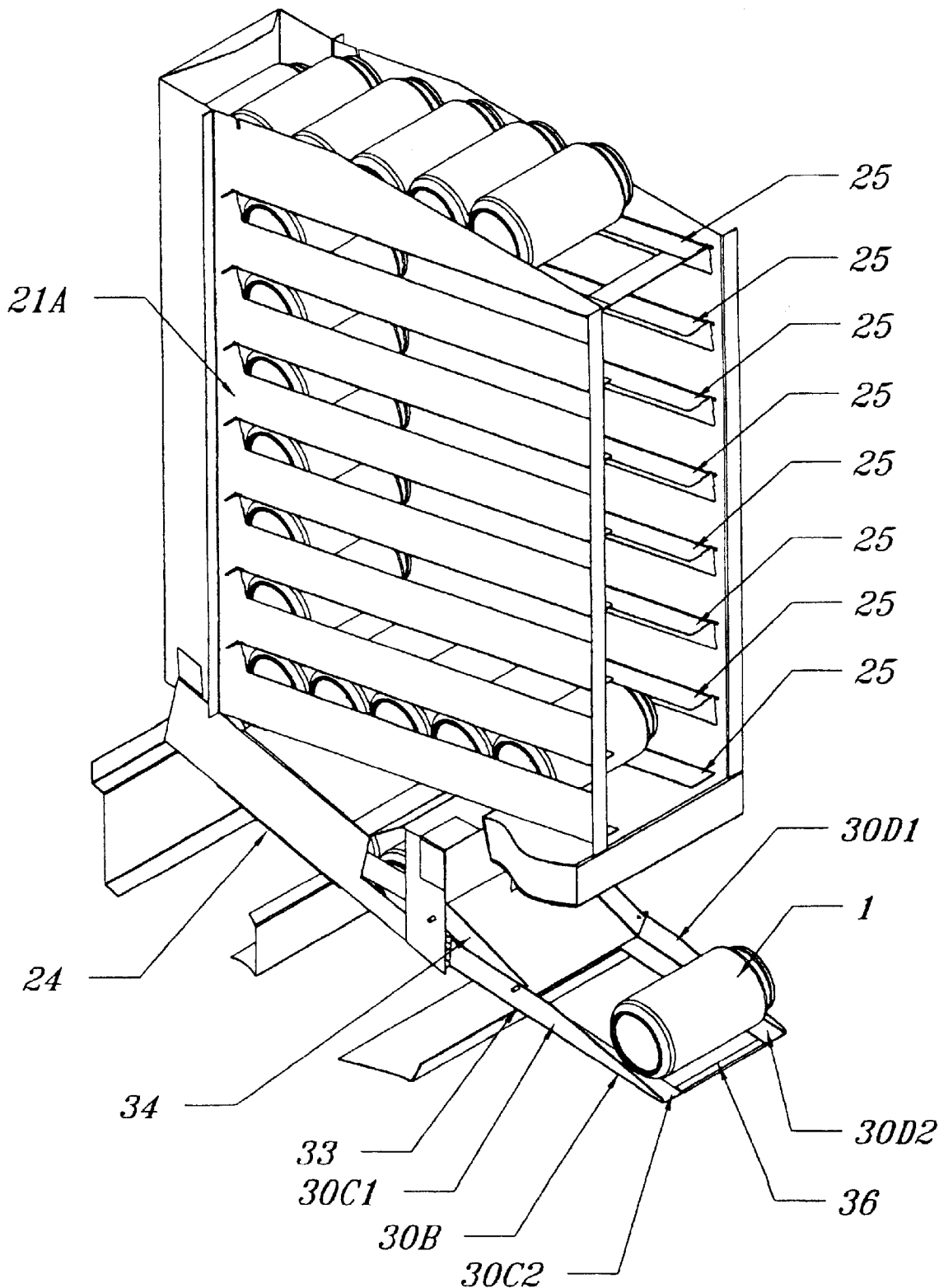
FIG. 1 is a partial perspective view of the liquid container dispensing apparatus.
Figure 2A:
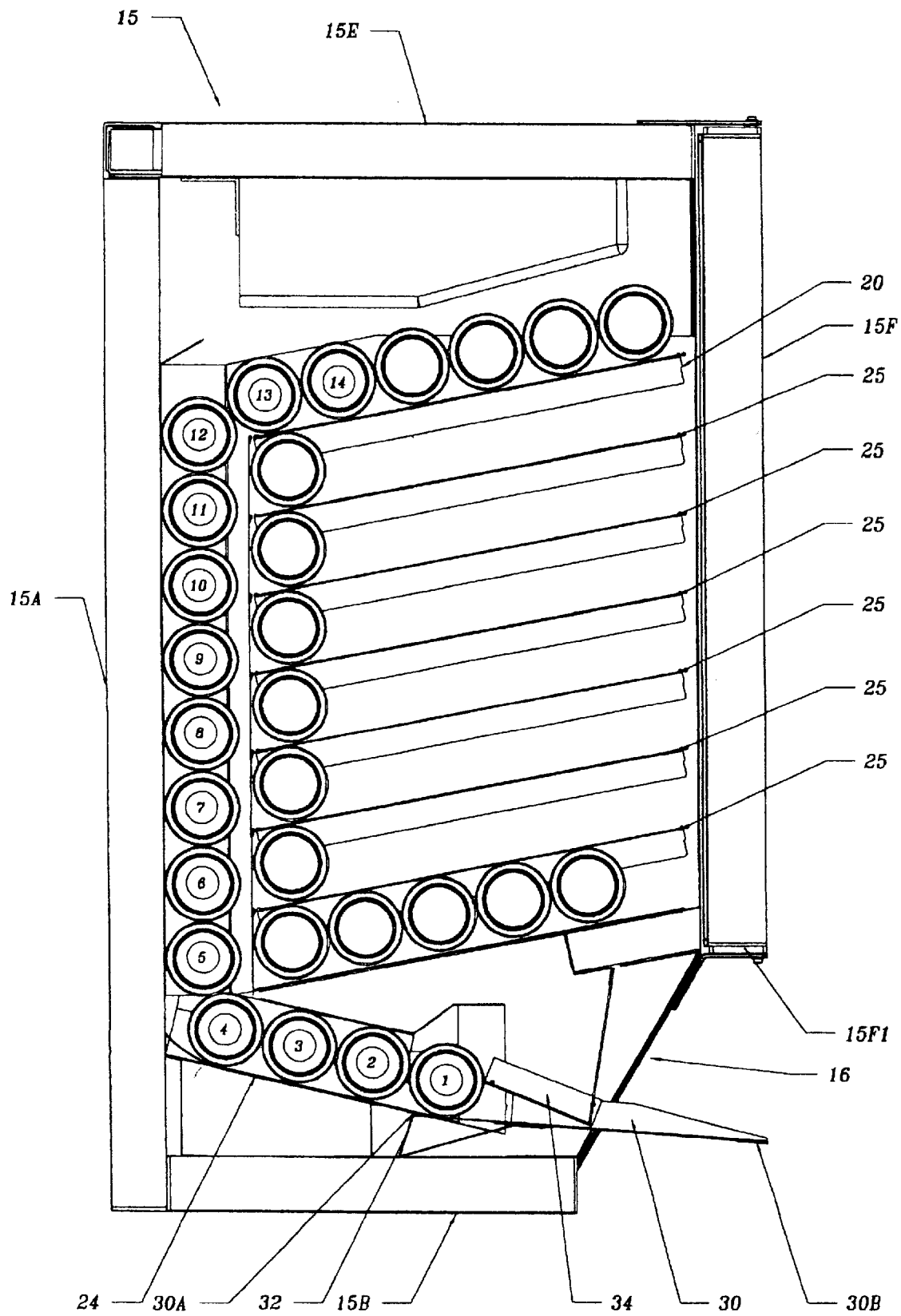
FIG. 2A is a side elevational view of the liquid container dispensing apparatus in accordance with the description given.
Figure 2B:
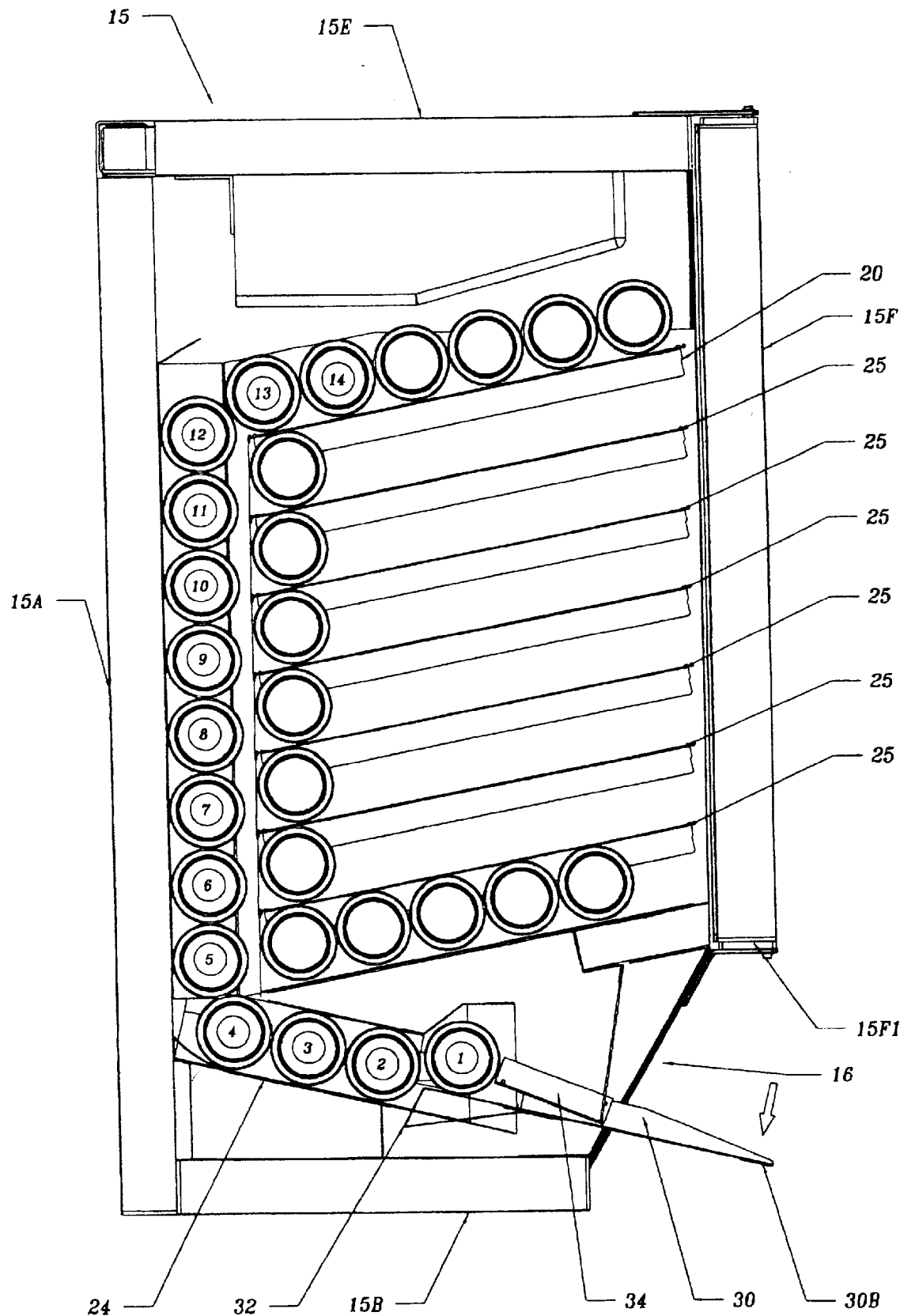
FIG. 2B–E sequentially illustrate the operation of the liquid container dispensing apparatus.
Figure 2C:
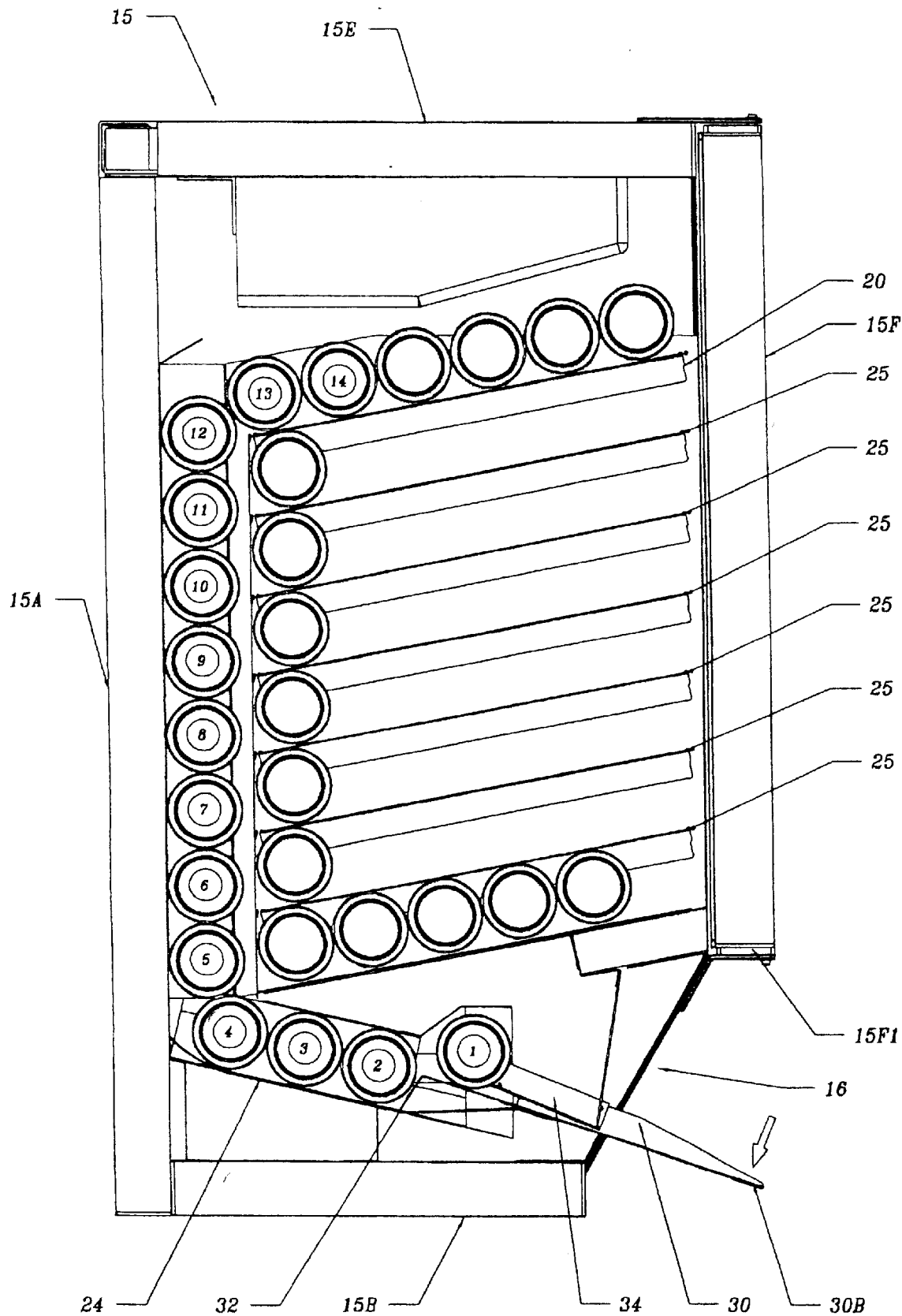
Figure 2D:
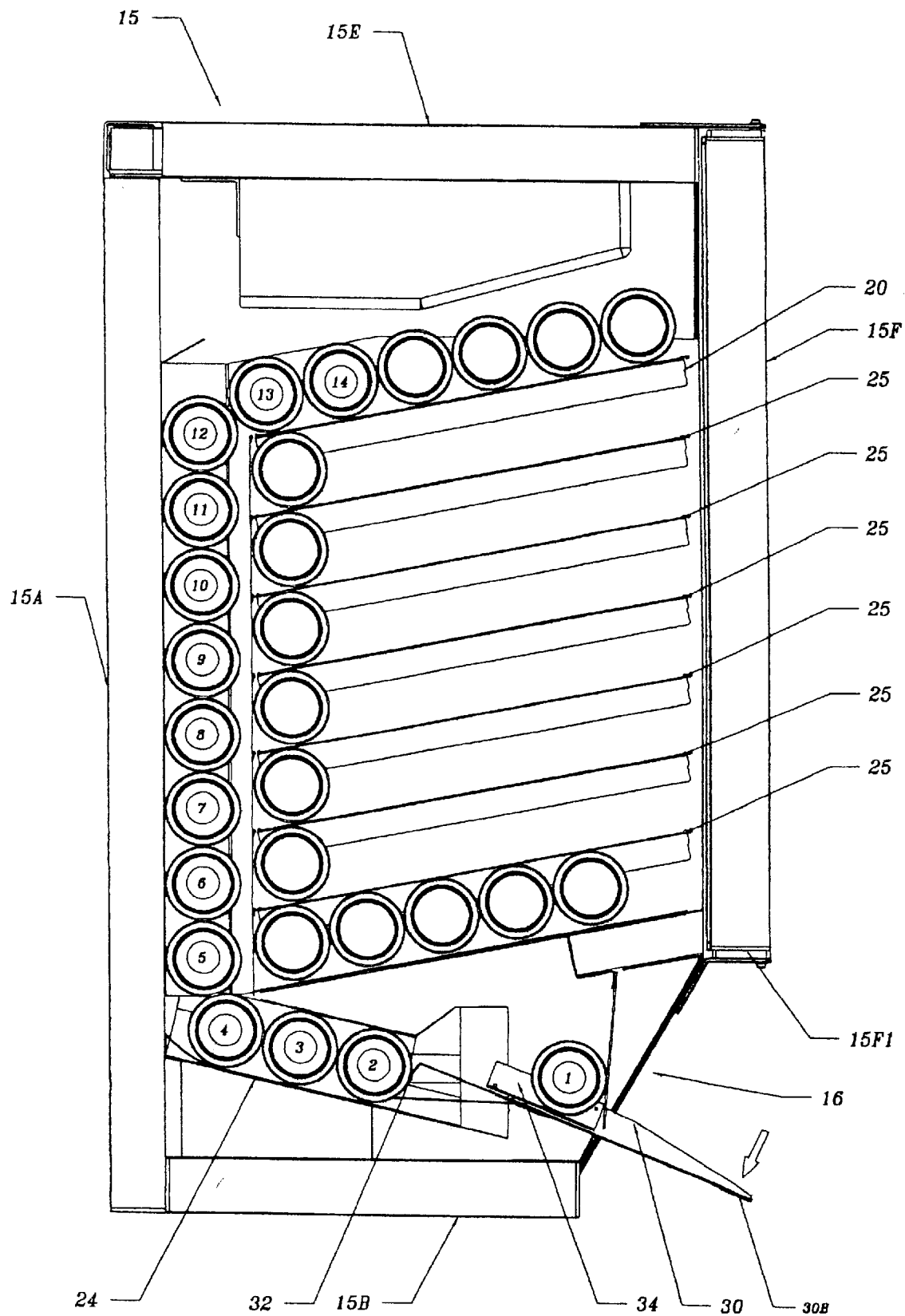
Figure 2E:
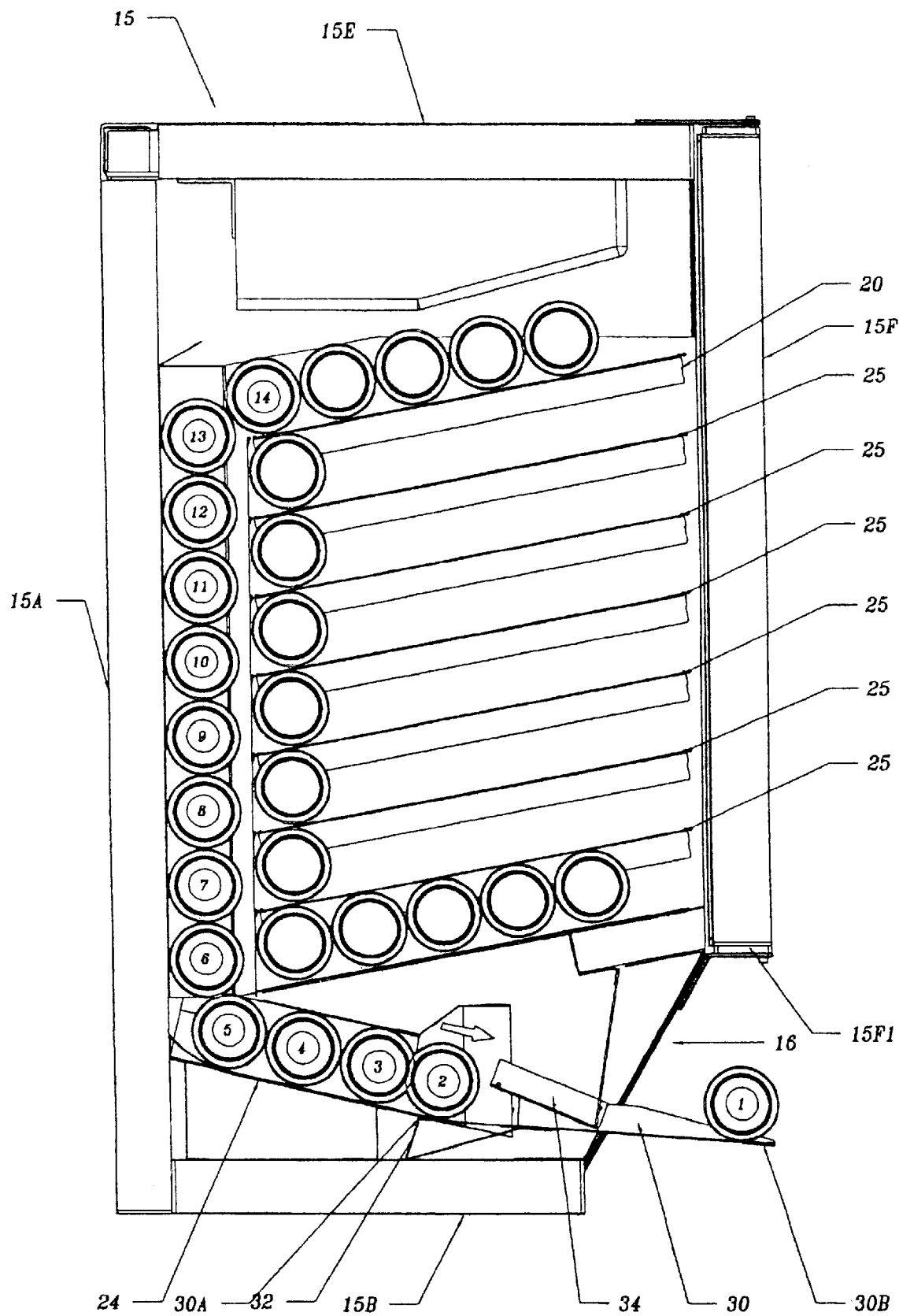
Figure 3:
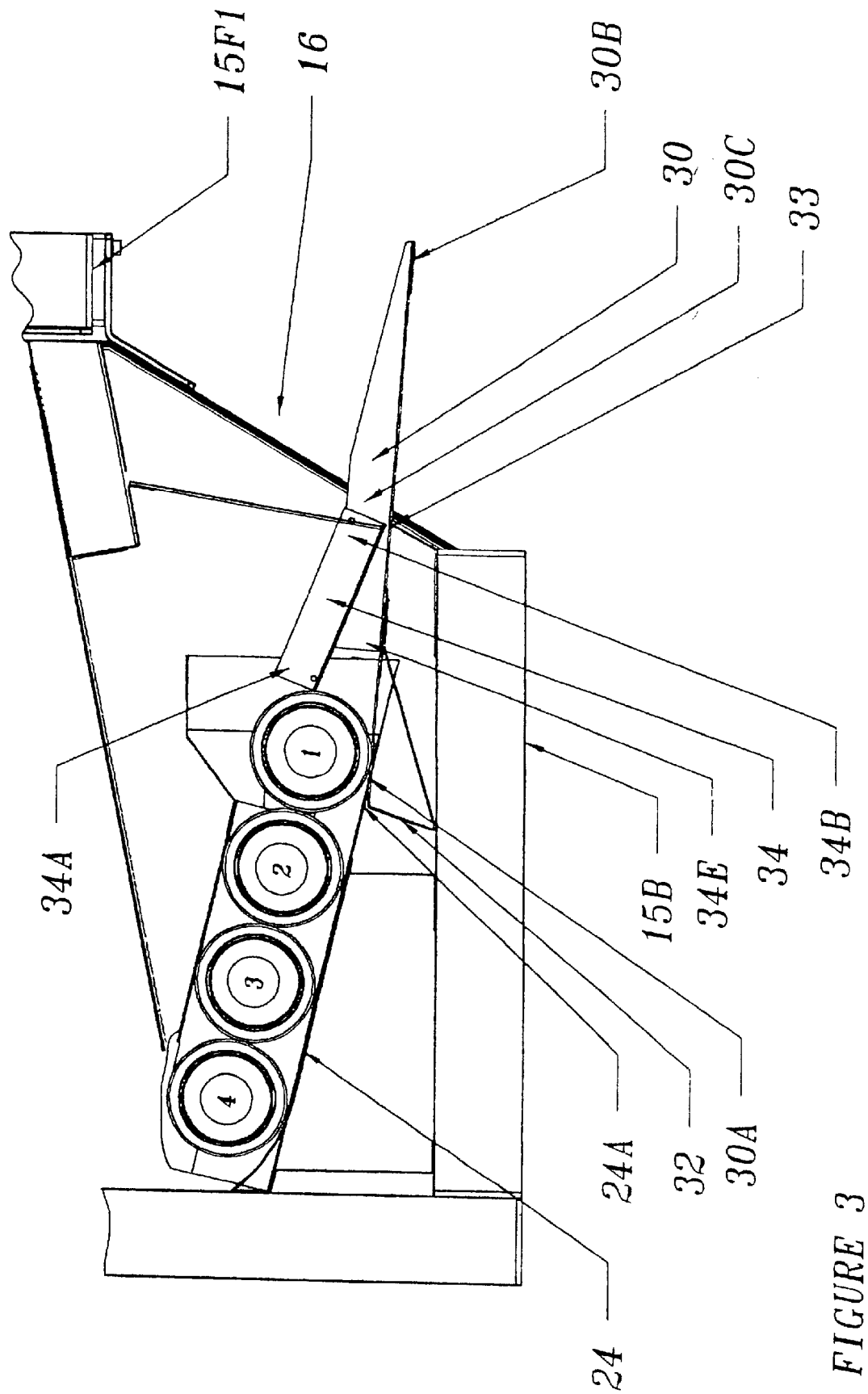
FIG. 3 is a cross-sectional view of the liquid container dispensing apparatus in a rest position.
Figure 4:
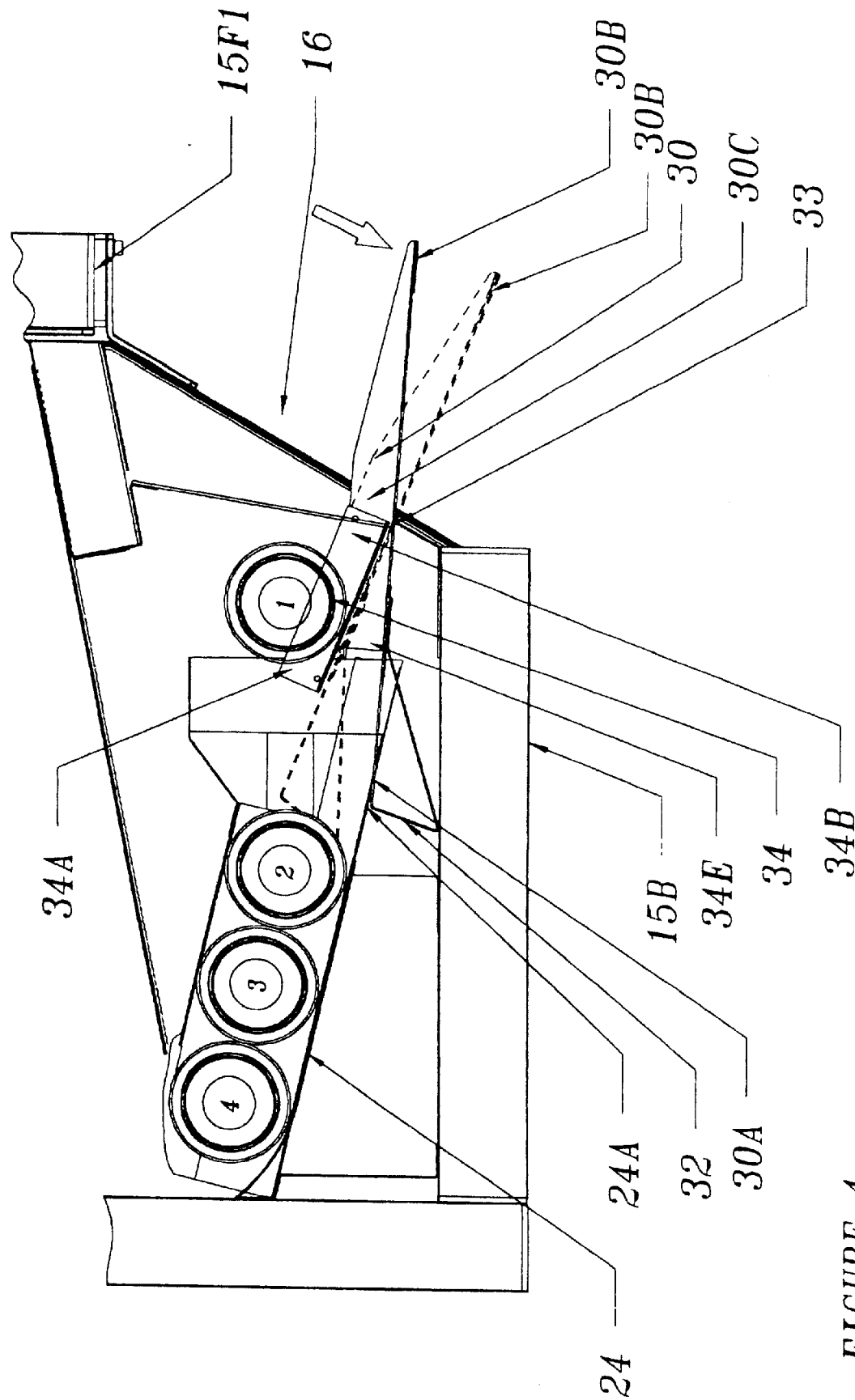
FIG. 4 is a cross-sectional view of the liquid container dispensing apparatus showing, in dashed lines, a raised position of the lever member.
Figure 5:
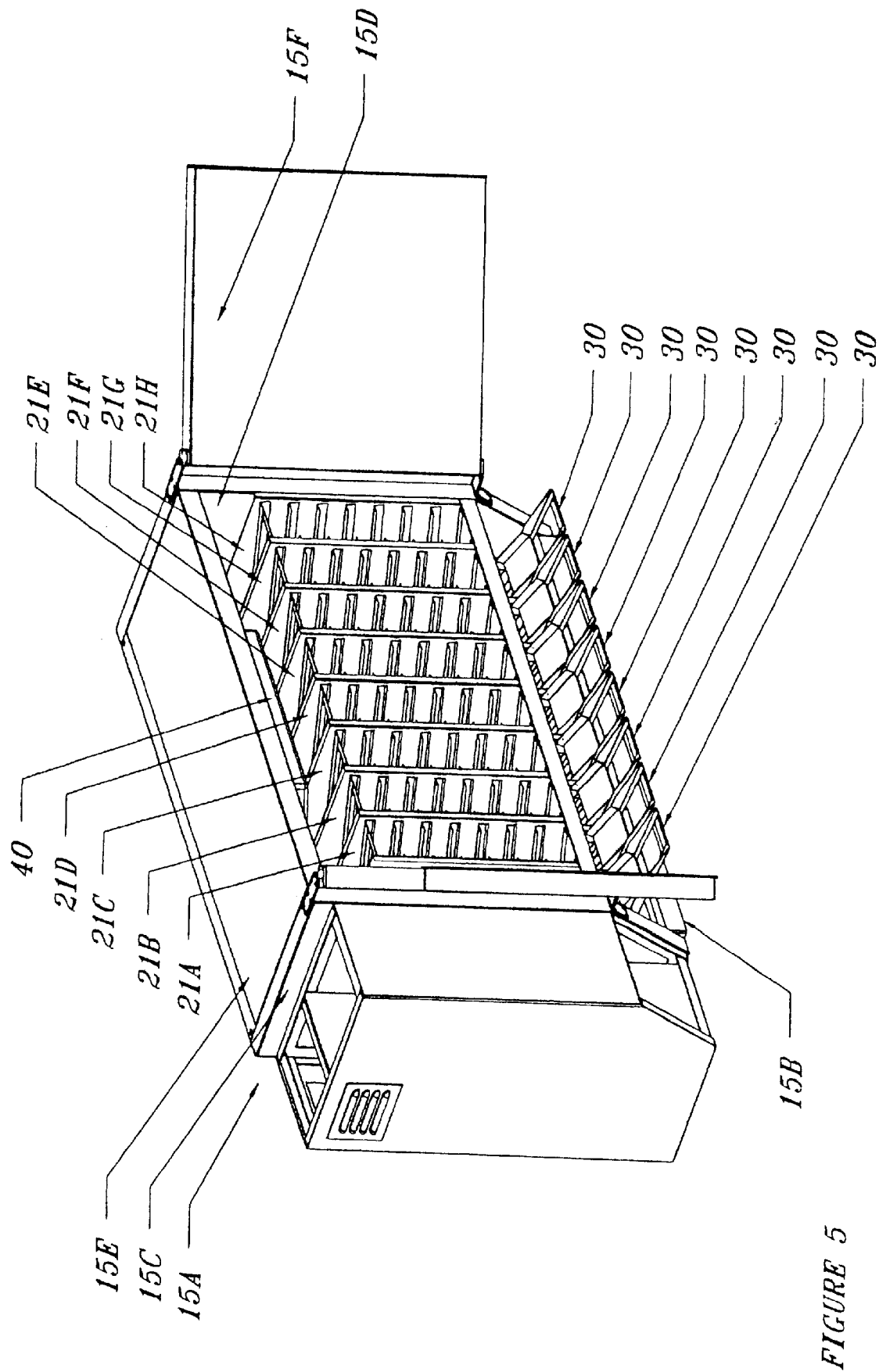
FIG. 5 is a detailed perspective view of the storage rack of the liquid container dispensing apparatus.

Referring to the drawings in FIGS. 1–5, in particular, the liquid container dispensing apparatus comprises a storage unit 15 having side walls 15C–D, a bottom wall 15B, a top wall 15E, and a back wall 15A and an openable front wall 15F with the front wall 15F having a bottom end 15F1 which is vertically spaced from the front end of the bottom wall 15B thus forming a dispensing port 16 therebetween, the dispensing port 16 being dimmensioned to allow a liquid container to pass from inside the storage unit 15 to the outside thereof and further comprises a storage rack 20 having a plurality of vertically-disposed partitions 21A–21D which are laterally spaced from one another and which form a plurality of storage compartments therebetween, two of the partitions forming the opposing sides of the storage rack 20. The partitions 21A–21D adjacent to one another are spaced to allow liquid containers to freely move or roll therebetween and upon a plurality of elongate flange members 25 which are fixedly and spacedly attached conventionally to the sides of the partitions 21A–21D. For each side of the partitions 21A–21H with elongate flange members 25 attached thereto, the elongate flange members 25 are vertically spaced thereupon and are also disposed relatively parallel to one another with each elongate flange member inclined downwardly from the front end to the back end thereof so that the liquid containers will roll or move upon the elongate flange members 25 as the storage rack 20 is loaded with such containers. The back ends of the elongate flange members 25 terminate short of the back wall 15A thus defining dispensing chutes 24 therebetween for allowing such containers to move laterally between the back ends of the elongate flange members 25 and the back wall 15A. Further, the dispensing chutes 24 are angled downwardly and forwardly below the lowermost shelves of the storage rack 20 and above the bottom wall 15B of the storage unit 15.

The elongate flange members 25 form a plurality of shelves upon which the containers are stored. Each shelf comprises a pair of opposed elongate flange members 25 one of which is attached to a side of a first partition and the other of which is attached to a side of an adjacent partition, the side of which faces the first partition. Each pair of elongate flange members 25 are generally coplanar and laterally spaced from one another with only end portions of each liquid container supported upon the pair of elongate flange members 25. Each compartment comprises a plurality of shelves which are vertically arranged with the lowermost shelf being disposed above a portion of the discharge chute which is angled downwardly and forwardly above the bottom wall 15B.

A dispensing means is used to dispense the containers individually one by one through the dispensing port 16 and comprises a plurality of lever members 30 one for each compartment. Each lever member 30 has a back end 30A which is disposed inside the storage unit 15 and further has a front end 30B which is exposed outside the storage unit 15 for easy access by the user. Each lever member 30 includes a pair of opposed L-shaped elongate members 30C–D spaced apart and generally facing each other with first portions 30C1,30D1 extending vertically and second portions 30C2,30D2 inwardly extending perpendicular to the first portions 30C1,30D1 and being coplanar to one another and also being conventionally interconnected by at least one cross member 36, and further includes a catch member 32 which includes a first portion which extends perpendicularly downwardly at the back end 30A of the respective lever member 30 and further includes a second portion which is angled relative to the first portion and is attached to the underside of the lever member 30. In addition, each lever member 30 is pivotally mounted upon a fulcrum member 33 which is securely mounted with conventional means upon the bottom wall 15B near the dispensing port 16. Also, attached to each lever member 30 is a linkage member 34 which includes a ramp 34C having a pair of upturned sides to guide the liquid containers thereupon and further having a back end 34A which is pivotally mounted with conventional means to the storage rack 20, and also having a front end 34B which is pivotally connected with conventional means to the first portions of the respective L-shaped elongate members 30C–D and which is disposed relatively lower than the back end 34A. Optionally, a fan member 40 is conventionally mounted in the ceiling of the storage unit 15 and includes a conventional fan motor to actuate the fan blades which circulate the air inside the storage unit 15 to substantially provide even cooling of the liquid containers anywhere inside the storage unit 15 and which are protected by louvers.

In operation, the user loads the storage unit 15 with conventional liquid containers such as cans from the bottom up which includes placing each liquid container on its side on the selected shelf. With the shelves being inclined downwardly from the front to the rear, each liquid container will roll from the front to the back on the respective shelves. As the first liquid containers 1–14 roll to the back, they will drop off the back end of the respective shelves into and along the dispensing chutes 24 and will roll toward the lever member 30 and will be stopped by the respective linkage member 34. At rest the back ends 30A of the lever members 30 are substantially flush with the front ends 24A of the dispensing chutes 24 so that first-in-line liquid containers 2 roll onto the rear ramp portions 30e of the lever members 30 against the back ends 34A of the linkage members 34 with the remaining liquid containers 2–14 being serially aligned side-by-side in the dispensing chutes 24A–B including vertically along the back wall 15A between the back ends 25A of the shelves and the back wall 15A.

To individually dispense a liquid container 1 from the selected compartment, the user places his/her thumb on the front end 30B of the particular lever member 30 with the palm facing upward and uses his/her thumb to urge the front end 30B of the lever member 30 downwardly which raises the back end 30A of the lever member 30 which lifts the liquid container 1 disposed upon the rear ramp portion 30C of the lever member 30 upward upon the linkage member 34. From there, the liquid container 1 rolls down the linkage member 35 onto the front end 30B of the lever member 30 and into the awaiting palm of the user. As the selected liquid container 1 is being dispensed, the next-in-line liquid container 2 advances against the catch member 32 which is now disposed above the front end of the respective discharge chute 24 to prevent the next-in-line liquid container 2 from freely falling out of the dispensing apparatus. After receiving the selected liquid container, the user releases the lever member which causes it to pivot upon the fulcrum member 33 with the back end of the lever member lowering to its rest position with the back end of the lever member being essentially flush with the front end of the discharge chute 24 to allow the next-in-line liquid container 2 to roll upon the rear ramp portion of the lever member 30 and against the back end of the linkage member 34. As the next-in-line liquid container 2 advances onto the lever member 30, all the remaining liquid containers advance along including the liquid containers vertically stacked in the space between the back wall 15A and the back ends 25A of the shelves. The uppermost shelves are emptied first. In order to get a liquid container each time, the user must press the front end 30B of the lever member 30 downwardly and then release it. Because of the unique storage rack 20, more liquid containers can be stored in this dispensing apparatus than in any of the known prior art.

Various changes and departures may be made to the invention without departing from the spirit and scope thereof. Accordingly, it is not intended that the invention be limited to that specifically described in the specification or as illustrated in the drawings but only as set forth in the claims.

What is claimed is:

1. A liquid container dispensing apparatus comprising:
   a storage unit having a top wall, side walls, back wall, and bottom wall;
   a storage rack securely disposed inside of said storage unit and having a plurality of compartments each of which includes a plurality of shelves vertically arranged, each of said shelves having a front end and a back end and being inclined downwardly from said front end to said back end, further said back ends being spaced from said back wall to form dispensing chutes to allow liquid containers to pass therein, said discharge chutes being defined by said back wall and further being angled downwardly and forwardly below said storage rack said storage rack comprises a plurality of spaced-apart vertically-oriented partitions having sides, said partitions immediately adjacent to one another forming respective said compartments; and
   means for dispensing liquid containers from said storage unit, said dispensing means including a plurality of lever members one for each compartment, each of said lever members being pivotally mounted upon a fulcrum member and having a back end and a front end and ramp portions, said back ends of said lever members being disposed inside said storage unit and said front ends of said lever members being exposed outside of said storage unit, said dispensing means further including a plurality of linkage members one for each of said lever members, each of said linkage members having a front end and a back end and a ramp adapted to allow liquid containers to move thereupon, said back ends of said linkage members 34 being elevated relative to said front ends of said linkage members 34 which are pivotally attached to said lever members, said back ends of said linkage members adapted to substantially prevent liquid containers from freely falling out of said storage unit, said dispensing means further including a plurality of catch members disposed at said back ends of said lever members for preventing next-in-line liquid containers advancement while first-in-line liquid containers are being dispensed from said storage unit.

2. A liquid container dispensing apparatus as described in claim 1, wherein said storage unit further includes an openable front wall which has a bottom end which is spaced from said bottom wall thus forming a container discharge port therebetween, said container discharge port being adapted to allow said liquid containers to be dispensed therethrough and out of said storage unit.

3. A liquid container dispensing apparatus as described in claim 1, wherein said storage rack further comprises a plurality of elongate flange members securely attached to and horizontally disposed and vertically spaced upon said sides of said partitions, said elongate flanges forming said shelves.

4. A liquid container dispensing apparatus as described in claim 3, wherein each of said elongate flange members has a front end and a back end, each of said elongate flange members being inclined downwardly from said front end to said back end to urge said liquid containers to roll toward and off said back ends of said elongate flange members into said discharge chutes.

5. A liquid container dispensing apparatus as described in claim 4, wherein each of said shelves comprises a pair of said elongate flange members laterally spaced from and laterally aligned to one another, one of said pair of said elongate flange members being disposed to one of said sides of a respective said partition and the other of said pair of said elongate flange members being disposed to one of said sides of an adjacent said partition, said pair of said flange members extending between respective said partitions.

6. A liquid container dispensing apparatus as described in claim 5, wherein said back ends of said elongate flange members are spaced from said back wall to allow said liquid containers to drop off said back ends of said elongate flange members and into said discharge chute.

7. A liquid container dispensing apparatus as described in claim 1, wherein at rest, said back ends of said lever members are substantially flush with front ends of said discharge chutes and are generally elevated relative to said front ends of said lever members to allow liquid containers to move from said discharge chutes onto rear ramp portions of said lever members.

8. A liquid container dispensing apparatus as described in claim 7, wherein at rest, said back ends of said linkage members are elevated relative to said rear ramp portions of said lever members such that first-in-line liquid containers rest against said back ends of said linkage members and are prevented from falling out of said storage unit.

9. A liquid container dispensing apparatus as described in claim 1, wherein said catch members extend downwardly from said back ends of said lever members to engage and prevent advancement of next-in-line liquid containers while first-in-line liquid containers are being dispensed.

10. A liquid container dispensing apparatus as described in claim 9, wherein at rest, said catch members extend below said front ends of said discharge chutes.

11. A liquid container dispensing apparatus as described in claim 10, wherein when dispensing liquid containers, said catch members are elevated above said front ends of said discharge chutes to prevent advancement of and engage next-in-line liquid containers.

12. A liquid container dispensing apparatus comprising:

a storage unit having a top wall, side walls, back wall, and bottom wall;

a storage rack securely disposed inside of said storage unit and having a plurality of compartments each of which includes a plurality of shelves vertically arranged, each of said shelves having a front end and a back end and being inclined downwardly from said front end to said back end, further said back ends being spaced from said back wall to form dispensing chutes to allow liquid containers to pass therein, said discharge chutes being defined by said back wall and further being angled downwardly and forwardly below said storage rack and means for dispensing liquid containers from said storage unit, said dispensing means including a plurality of lever members one for each compartment, each of said lever members being pivotally mounted upon a fulcrum member and having a back end and a front end and ramp portions, said back ends of said lever members being disposed inside said storage unit and said front ends of said lever members being exposed outside of said storage unit, said dispensing means further including a plurality of linkage members one for each of said lever members, each of said linkage members having a front end and a back end and a ramp adapted to allow liquid containers to move thereupon, said back ends of said linkage members 34 being elevated relative to said front ends of said linkage members 34 which are pivotally attached to said lever members, said back ends of said linkage members adapted to substantially prevent liquid containers from freely falling out of said storage unit, said dispensing means further including a plurality of catch members disposed at said back ends of said lever members for preventing next-in-line liquid containers advancement while first-in-line liquid containers are being dispensed from said storage unit wherein each of said lever members includes a pair of elongate L-shaped members spaced-apart and facing one another with portions of said pair of elongate L-shaped members forming said ramp portions and being generally coplanar with one another.

* * * * *